United States Patent
Pierce et al.

[19]

[11] Patent Number: 6,102,063
[45] Date of Patent: Aug. 15, 2000

[54] AIR PUMP VALVE HEAD FOR GRIPPING BOTH SCHRADER AND PRESTA VALVES

[75] Inventors: Brendan E. Pierce, Los Gatos; John A. Gunther, Redwood City, both of Calif.

[73] Assignee: Bell Sports, Inc., San Jose, Calif.

[21] Appl. No.: 09/386,598

[22] Filed: Aug. 31, 1999

Related U.S. Application Data

[63] Continuation-in-part of application No. 09/376,887, Aug. 18, 1999.

[60] Provisional application No. 60/097,027, Aug. 18, 1998.

[51] Int. Cl.[7] ................................................. F16K 15/20
[52] U.S. Cl. ........................ 137/231; 137/223; 251/149.6; 285/346
[58] Field of Search ................................. 137/223, 231; 251/149.6, 149.8; 285/102, 312, 346

[56] References Cited

U.S. PATENT DOCUMENTS

| | | | |
|---|---|---|---|
| 1,784,822 | 12/1930 | Crowley | 251/149.6 |
| 3,329,180 | 7/1967 | Van Brocklin | 251/149.6 |
| 3,926,205 | 12/1975 | Gourlet | 137/223 |
| 5,379,796 | 1/1995 | Wang | 137/231 |
| 5,666,990 | 9/1997 | Wu | 137/223 |
| 5,749,392 | 5/1998 | Glotin | 137/231 |
| 5,762,095 | 6/1998 | Gapinski et al. | 137/223 |
| 5,902,097 | 5/1999 | Wu | 137/223 X |
| 5,960,815 | 10/1999 | Wang | 137/223 X |
| 5,983,920 | 11/1999 | Gapinski et al. | 137/231 |

FOREIGN PATENT DOCUMENTS

| 313809 | 6/1929 | United Kingdom | 285/346 |
|---|---|---|---|

*Primary Examiner*—John Rivell
*Assistant Examiner*—Meredith H. Schoenfeld
*Attorney, Agent, or Firm*—Robert O. Guillot

[57] ABSTRACT

The valve head of the present invention is designed for engaging both a Schrader and a Presta valve. It includes a housing having generally cylindrical sidewalls and a base wall. A collet is disposed within the housing. The collet has generally cylindrical sidewalls and a plurality of upwardly extending collet fingers. A generally cylindrical gasket member is disposed within the collet. The gasket is composed of a resilient material and has a valve insertion bore formed centrally therethrough. A camming lever is operably engaged to the collet and functions to pull the collet downwardly into the housing. The downward movement of the collet causes the collet fingers to move inwardly, thereby creating an inwardly directed force upon the resilient gasket such that the diameter of the gasket bore is reduced. When a Schrader valve is disposed within the gasket bore, a valve pin depression tip acts to depress the Schrader valve pin, thus permitting pumped air to flow through the Schrader valve. When a Presta valve is disposed within the gasket bore, the tip is prevented from applying undue force to the Presta valve pin by a flexible mounting of the tip within the valve head.

12 Claims, 4 Drawing Sheets

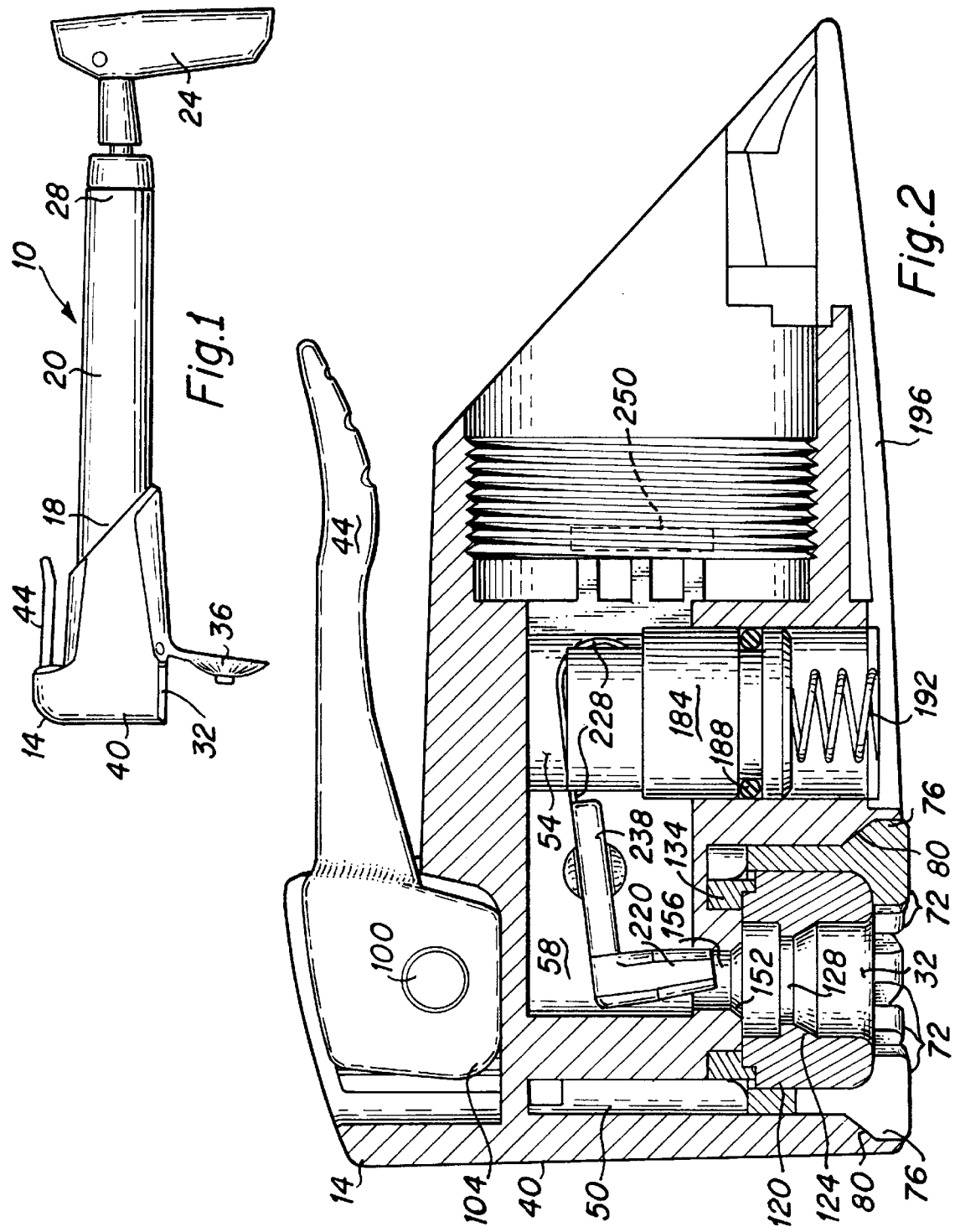

AIR PUMP VALVE HEAD FOR GRIPPING BOTH SCHRADER AND PRESTA VALVES

CROSS REFERENCE TO RELATED APPLICATIONS

This application is a continuation-in-part of pending U.S. patent application Ser. No. 09/376,887, filed Aug. 18, 1999 entitled Air Pump Valve Head for Both Schrader and Presta Valves, by Brendan E. Pierce, an inventor hereof; which claims priority to U.S. Provisional Patent Application Ser. No. 60/097,027 filed Aug. 18, 1998, entitled Air Pump Valve Head for Both Schrader and Presta Valves, by Brendan E. Pierce, an inventor hereof.

BACKGROUND OF THE INVENTION

1. Field of the Invention

The present invention relates generally to bicycle pump valve heads, and more particularly to a valve head that matingly engages both Schrader and Presta valves without any adjustment of the valve head components.

2. Description of the Prior Art

As is well known, bicycle tires have been manufactured for many years with two different types of air valves, the Schrader valve and the Presta valve. Therefore, it has been necessary for manufacturers to create two different valve heads, each of which can each mate with one of the two different valves. Some manufacturers have created a single valve head that is formed as a T, wherein one side of the T possesses a Schrader valve head and the other side of the T possesses a Presta valve head.

There have also been successful efforts to create a single valve head that is adaptable for mating with both Schrader and Presta valves. Such valve heads have included internal components that must be manipulated or changed, such that the valve head is engageable with a Schrader valve in one component configuration and is likewise engageable with a Presta valve in a second component configuration. While this type of single valve head has certain advantages over the prior art valve heads, the requirement that the user must alter the configuration of components within the valve head to change it from Schrader valve compatibility to Presta valve compatability has still created some difficulty and inconvenience. There is therefore a need for a single valve head that is compatible with both Schrader and Presta valve configurations, which valve head does not require any adjustments or internal valve component changes.

SUMMARY OF THE INVENTION

The valve head of the present invention is designed for engaging both a Schrader and a Presta valve. It includes a housing having generally cylindrical sidewalls and a base wall. A collet is disposed within the housing. The collet has generally cylindrical sidewalls and a plurality of upwardly extending collet fingers. A generally cylindrical gasket member is disposed within the collet. The gasket is composed of a resilient material and has a valve insertion bore formed centrally therethrough. A camming lever is operably engaged to the collet and functions to pull the collet downwardly into the housing. The downward movement of the collet causes the collet fingers to move inwardly, thereby creating an inwardly directed force upon the resilient gasket such that the diameter of the gasket bore is reduced. When a Schrader valve is disposed within the gasket bore, a valve pin depression tip acts to depress the Schrader valve pin, thus permitting pumped air to flow through the Schrader valve. When a Presta valve is disposed within the gasket bore, the tip is prevented from applying undue force to the Presta valve pin by a flexible mounting of the tip within the valve head.

It is an advantage of the present invention that a single valve head that is capable of engaging both Schrader and Presta valves has been created.

Is another advantage of the present invention that a single valve head that engages both Schrader and Presta valves without the changing, adjustment or manipulation of components therein has been developed.

It is a further advantage of the present invention that a single valve head that engages both Schrader and Presta valves has been developed which is easy to utilize.

It is yet another advantage of the present invention that a single valve head for the engagement of both Schrader and Presta valves has been developed which is easy and relatively inexpensive to manufacture.

These and other features and advantages of the present invention will become well understood by those skilled in the art upon reading the following detailed description which makes reference to the several figures of the drawings.

IN THE DRAWINGS

FIG. 1 is a side elevational view of a pump including the valve head of the present invention;

FIG. 2 is a side cross-sectional view of the valve head;

DESCRIPTION OF THE INVENTION

Figure 3:
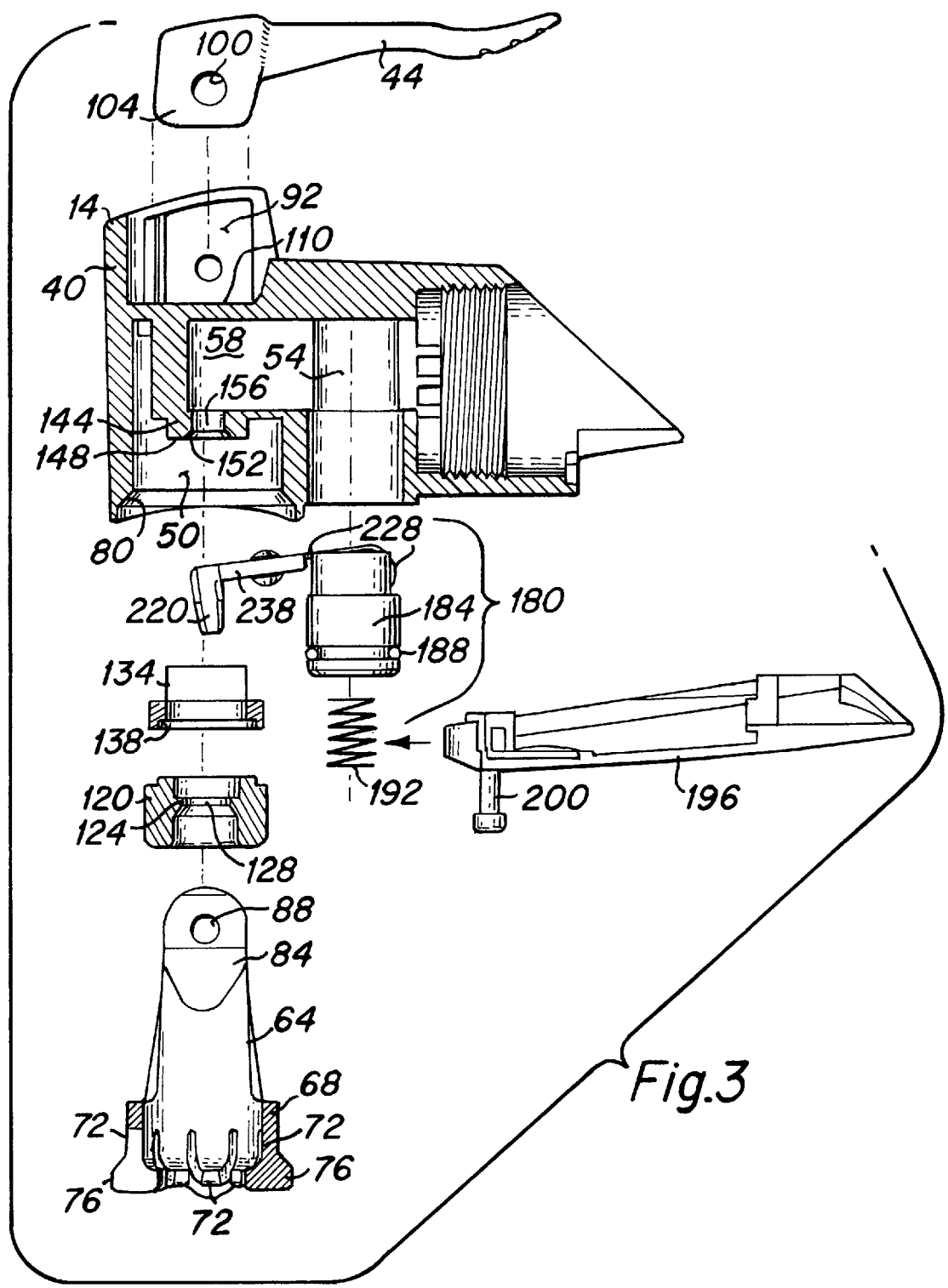
FIG. 3 is an assembly drawing in side view of the valve head.

The present invention is an air pump valve head that is adaptable for engaging both Schrader valves and Presta valves that are typically found on bicycle tires. FIG. 1 is a side elevational view of a pump 10 that includes the valve head 14 disposed upon the forward end 18 of the barrel 20 of the pump 10. A pump handle 24 is engaged to the rearward end 28 of the barrel 20. The valve head 14 includes a tire valve insertion orifice 32 and an orifice dirt cover 36 that is engaged to the housing 40 of the valve head 14. A user operable valve engagement lever 44 is pivotably engaged within the valve head 14 in a manner that is discussed herebelow with the aid of FIGS. 2, 3 and 4.

Figure 4:
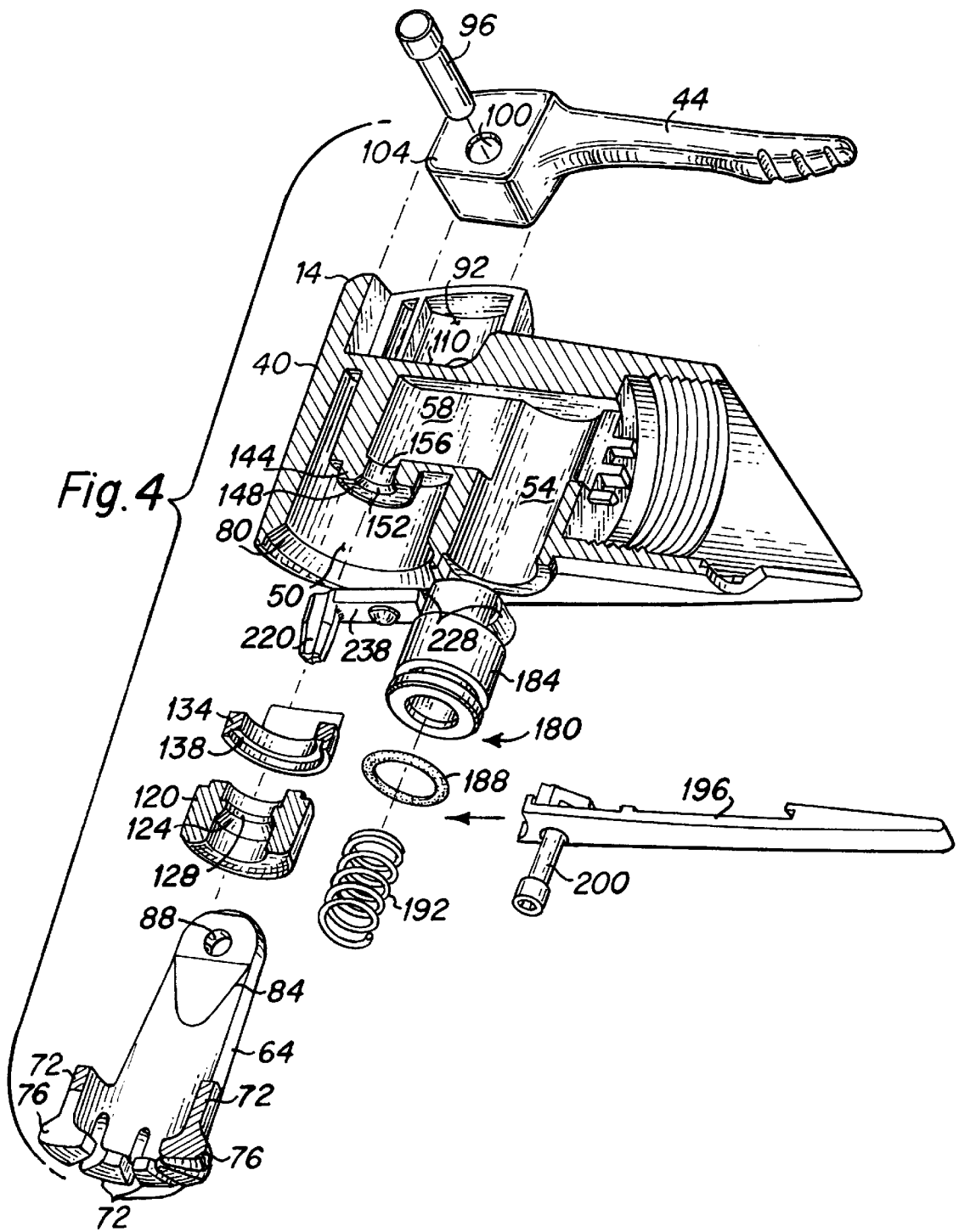
FIG. 4 is an assembly drawing in perspective view of the valve head.

The internal components of the valve head 14 are depicted in FIGS. 2, 3 and 4, wherein FIG. 2 is a side cross-sectional view, FIG. 3 is an assembly drawing in side view, and FIG. 4 is an assembly drawing in perspective view. As depicted in FIGS. 2, 3 and 4, the housing 40 includes a collet assembly bore 50 and a plunger assembly bore 54 that are pneumatically connected through a pressure chamber 58. A collet 64 is slidably engaged within the collet bore 50. The collet 64 includes a cylindrical body portion 68 having a plurality of collet fingers 72 integrally formed therewith. The collet fingers 72 include an outwardly projecting head portion 76 that is formed for slidable engagement with an outer lip portion 80 of the housing walls that form the collet bore 50. The collet 64 also includes two projecting collet arms 84 (one of which is shown in the side cross-sectional views of FIGS. 2, 3 and 4) that have a collet pin bore 88 formed therethrough. When the collet 64 is inserted within the collet bore 50, the arms 84 project into a distal portion 92 of the collet bore 50. A pivot pin 96 projects through the bores 88 and through a pivot pin bore 100 formed in a camming head 104 formed on the distal end of the valve engagement lever 44. It is therefore to be understood that when the lever arm 44 is rotated that the camming head 104 will engage an inner surface 110 within the valve housing 40, such that the rotating camming head 104 will cause the pivot pin, and therefore the engaged collet arms to pull inwardly, such that the collet 64 will be pulled into the collet bore 50 by the action of the camming head 104.

A generally cylindrical gasket 120 having an inwardly projecting lip portion 124 that defines a valve insertion bore 128 is disposed within the collet 64, such that the collet fingers 72 make contact with the gasket 120. The gasket 120 is held in a central position within the collet bore 50 by a gasket retaining ring 134 having a gasket seat groove 138 formed therein.

The housing 40 further includes a stationary valve insertion seat 144 that is centrally disposed within the collet bore 50. The valve insertion seat 144 includes an outer seat portion 148 for forming a seat with a Schrader valve that is inserted within the collet bore 50 and an inner seat portion 152 for forming a seat with a Presta valve that is inserted within the collet bore 50. An air passageway bore 156 is centrally formed through the seat 144 to permit the passage of pumped air into the Schrader or Presta valve, as is discussed in detail herebelow.

A plunger assembly 180 is slidably engaged within the plunger assembly bore 54 and pressure chamber 58. The plunger assembly 180 includes a plunger member 184 having an O-ring seal 188 engaged therewith for making an air-tight seal with the cylindrical walls of the plunger bore 54. A coil spring 192 is utilized to apply resilient pressure to the plunger 184 to urge it upwardly into the plunger bore 54, and a plunger chamber cap member 196 is engaged to the outer surface of the housing 40 using a threaded bolt 200 which is threadably engaged in a bore (not shown) in the housing 40, to hold the spring 192 and plunger 184 within the plunger chamber 54. A generally cylindrical Schrader valve pin depressing tip 220 is engaged to a leaf spring 228 which is engaged to the internal end of the plunger 184. The tip 220 is disposed on a projecting arm portion 238, such that the tip 220 is disposed within the pressure chamber 58 in alignment with the air passageway bore 156, whereas the leaf spring 228 is engaged with the plunger that is disposed within the plunger bore 54. A oneway check valve 250 is disposed within the housing 40 at the pneumatic interface with the pump barrel end 18, such that air may be pumped into the pressure chamber 58 from the barrel 20 but not returned from the pressure chamber 58 into the barrel 20. The operative features of the valve head 14 in connection both Schrader and Presta valves is next discussed with the aid of FIGS. 5, 6, 7 and 8.

Figure 5:
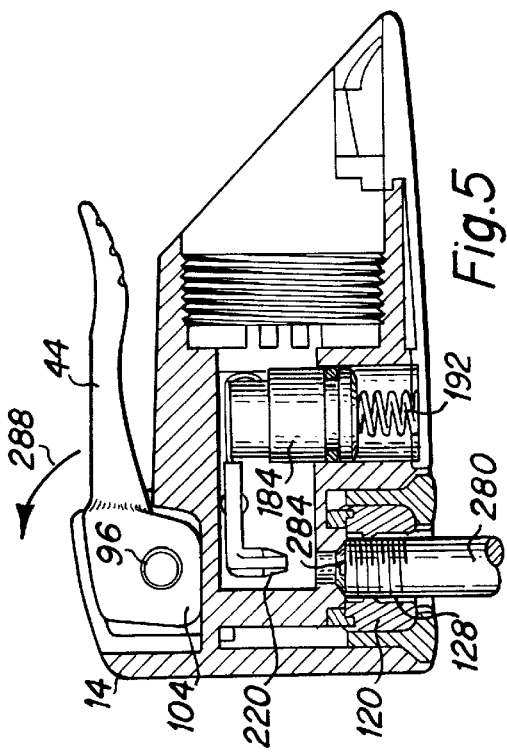
FIG. 5 is a side cross-sectional view depicting a Schrader valve within the valve head in an unengaged configuration.
Figure 6:
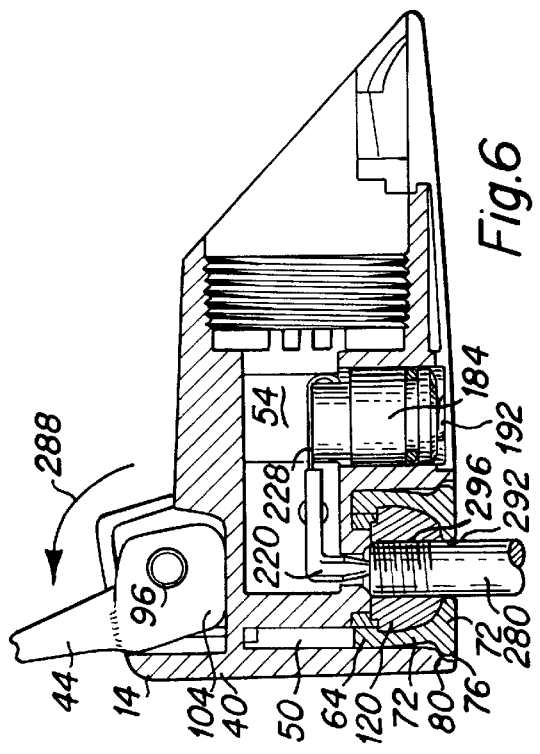
FIG. 6 is a side cross-sectional view of the valve head having a Schrader valve disposed therein in an engaged configuration.

FIG. 5 depicts a Schrader valve in its initial insertion within the valve head 14, and FIG. 6 depicts a Schrader valve as engaged within the valve head 14 with air being pumped into the Schrader valve. Initially, as depicted in FIG. 5, a Schrader valve 280 is inserted within the valve insertion bore 128 of the gasket 120 until it is seated against the Schrader seat portion 148. It is noted that the valve pin 284 of the Schrader valve 280 projects outwardly. Thereafter, as depicted in FIG. 6, the lever 44 is rotated 288 such that the camming head 104 pulls the pivot pin 96 downwardly, thus pulling the collet 64 inwardly into the collet bore 50. The outwardly projecting portions 76 of the collet fingers 72 are deflected inwardly 292 by the frictional interaction of the collet head portions 76 against the outer edge portions 80 of the housing sidewalls of the collet bore 50. The inward movement of the collet fingers 72 causes the resilient gasket 120 to be squeezed inwardly 296 to sealing engage the sides of the Schrader valve 280 to form an air-tight seal therewith.

When the pump handle 24 is next reciprocated it causes pressurized air to be pumped through the check valve 250 and into the pressure chamber 58 within the valve head 14. The pressurized air within the pressure chamber causes the plunger 184 to move outwardly within the plunger bore 54 against the spring 192. The outward motion of the plunger 184 causes a similar outward motion of the valve activating tip 220 which is connected through the leaf spring 228 to the plunger 184. When the air pressure within the pressure chamber 58 is greater than the air pressure within the device (such as a bike tire, not shown) that is engaged with Schrader valve 280, the tip 220 will press the Schrader valve pin 284 inwardly, such that pressurized air within the pressure chamber 58 can then pass into the Schrader valve 280. Thereafter, when the pump handle 24 is pulled outwardly, the check valve 250 prevents the air pressure within the chamber 58 from dropping. Thereafter, when the valve handle 24 is again pushed inwardly, further pressurized air is pumped through the check valve 250, into the pressure chamber 58, and into the Schrader valve 280. When the device attached to the Schrader valve has been suitably pressurized with pumped air, the lever 44 is rotated to release the sealing grip of the gasket 120 with the Schrader valve body 280, thereby releasing the Schrader valve. When the air pressure within the pressure chamber 58 returns to atmospheric pressure, the coil spring 192 pushes the plunger 184 upwardly, returning it to the position depicted in FIGS. 2 and 5. The utilization of the pump 10 with a Presta valve is next discussed with the aid of FIGS. 7 and 8.

Figure 7:
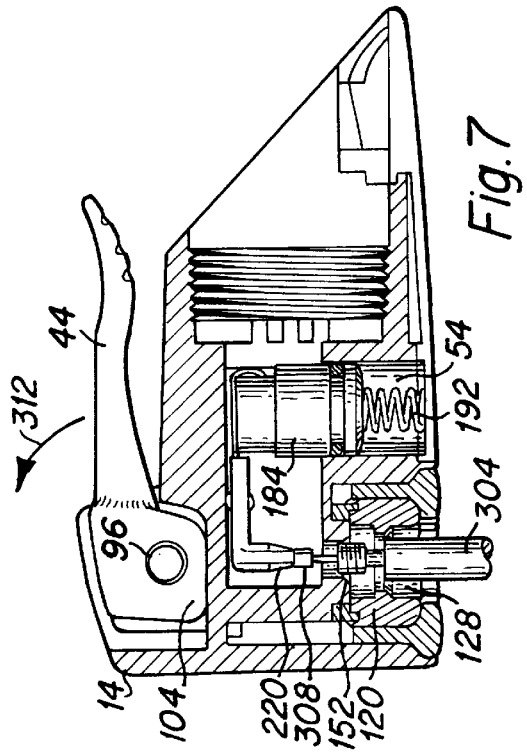
FIG. 7 is a side cross-sectional view of the valve head having a Presta valve disposed therewithin in an unengaged configuration.
Figure 8:
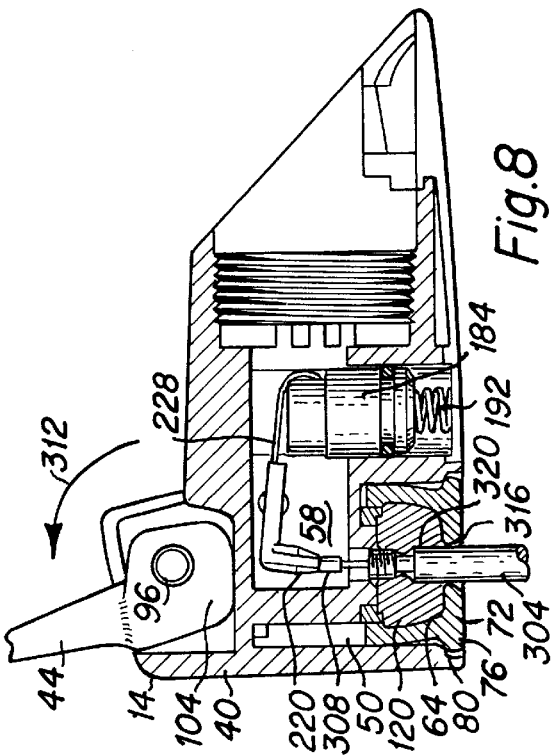
FIG. 8 is a side cross-sectional view of the valve head having a Presta valve disposed therewithin in an engaged configuration.

FIG. 7 depicts a Presta valve upon its initial insertion within the valve insertion bore 128 of the gasket 120. Owing to the thinner diameter of the Presta valve, as compared to the Schrader valve, the head portion 300 of the Presta valve 304 rests against the Presta valve seat 152. It is significant to note that the Presta valve pin 308 projects into the pressure chamber 58 but does not make contact with the Schrader valve pin tip 220. In this regard, the pressure chamber within the housing 40 is sized to avoid contact between the pin 308 and tip 220, as depicted in FIG. 7. The plunger 184 is upwardly disposed within the plunger bore 54 due to the urging of the coil spring 192.

To engage the Presta valve, the lever 44 is rotated 312, such that the camming head 104 pulls the collet 64 into the valve head housing 40. The collet fingers 72 are urged inwardly 316 due to the frictional engagement of the outwardly projecting portions 76 of the collet fingers 72 with the lip 80 of the housing walls of the collet bore 50, such that the resilient gasket 120 is squeezed inwardly 320 to make a sealing engagement with the Presta valve 304. Thereafter, when air is pumped into the pressure chamber 58, the plunger 184 is caused to move outwardly, as discussed hereabove with regard to FIG. 6, within the plunger bore 54. The Schrader pin tip 220 then makes contact with the valve pin 308 of the Presta valve. The valve pin 308 is generally somewhat delicate. To prevent damage to the valve pin 308, the leaf spring 228 which engages the tip 220 to the plunger 184 is flexed to absorb and relieve the force exerted by the tip 220 upon the pin 308. As the handle 24 is pushed inwardly, the pressurized air within the pressure chamber 58 is pumped into the Presta valve 304 when the air pressure within the pressure chamber 58 is greater than the air pressure within the device engaged to the Presta valve 304 (such as a bike tire, not shown).

Thereafter, when the device engaged to the Presta valve 304 has been pumped to a sufficient pressure, the lever 44 is released, such that the sealing engagement of the gasket 120 with the Presta valve 304 is released and the Presta valve is removed from the pump head. The air pressure within the pressure chamber 58 is released, and the coil spring 192 causes the plunger 184 to be pushed inwardly into the plunger chamber 54, thus returning the valve head components to the orientation depicted in FIGS. 2, 5 and 7.

It is therefore to be understood that the inward motion of the collet 64, with its flexible fingers that move inwardly to uniformly squeeze the gasket 120 against a valve (Schrader or Presta) disposed therewithin, allows the present invention to pump air into both a Schrader and Presta valve without any user necessitated adjustment of valve components. The valve head of the present invention is therefore suitable for engagement with both Schrader and Presta valves. The movable Schrader valve pin engagement tip 220 acts to depress the Schrader valve pin while preventing damage to a Presta valve pin, owing to the flexible nature of the tips engagement upon the leaf spring 228.

While the present invention has been shown and described with reference to certain preferred embodiments, it is to be understood that those skilled in the art will no doubt devise certain alterations and modifications in form and detail to the present invention. The following claims are therefore intended to cover all such alterations and modifications that nevertheless incorporate the true spirit and scope of the invention.

What I claim is:

1. A valve head for engaging both a Schrader and a Presta valve, comprising:

a housing and a resilient gasket disposed within said housing, said gasket being activatable to provide radial pressure against a Schrader valve disposed within said gasket, and a Schrader valve pin depression tip being mounted to a resilient member within said housing, said resilient member acting upon said valve pin depression tip to depress the valve pin of a Schrader valve.

2. A valve head as described in claim 1 wherein said valve head further includes a collet being engaged within said housing and acting to apply radial pressure against said gasket.

3. A valve head as described in claim 2 wherein said valve head further includes a cam lever being rotatably engaged to said collet and functioning to pull said collet downward within said housing.

4. A valve head as described in claim 2 wherein said collet includes deformable finger portions for gripping said gasket.

5. A valve head as described in claim 4 wherein said housing includes a beveled surface sidewall portion, and wherein said collet fingers include sidewall surfaces that are slidably engagable with said beveled surface of said housing, whereby said collet fingers are urged inwardly in contact with said beveled surface.

6. A valve head as described in claim 1 wherein said depression tip is flexibly mounted within said housing such that said tip applies minimal force to the valve pin of a Presta valve that is disposed within said gasket.

7. A valve head for engaging both a Schrader and a Presta valve, comprising:

a housing having generally cylindrical sidewalls and a base wall;

a collet having a generally cylindrical sidewall and a plurality of upwardly extending collet fingers engaged with said collet sidewall, said collet being disposed within a collet bore formed within said housing;

a gasket being generally cylindrical and having a valve insertion bore formed centrally therethrough, said gasket being composed of a resilient material, and wherein said gasket is disposed within said collet;

a camming lever being operably engaged to said collet and functioning to pull said collet into said housing;

whereby the inward movement of said collet creates an inwardly directed force upon said resilient gasket such that the diameter of said gasket valve insertion bore is reduced;

said housing further including a pneumatically activated plunger member that is disposed within a plunger bore formed within said housing;

a Schrader valve pin depression tip being flexibly engaged to said plunger and operable to deflect a Schrader valve pin when a Schrader valve is inserted within said valve insertion bore.

8. A valve head as described in claim 7 wherein said collet fingers include upper ends that are formed with outwardly projecting portions for engaging said sidewalls of said housing, such that upon said downward movement of said collet said collet fingers are caused to move radially inwardly due to a sliding engagement of said outwardly projecting portions of said collet fingers with said housing sidewalls.

9. A valve head as described in claim 7 wherein said housing base is formed with two openings therethrough, and wherein said collet is formed with downwardly projecting sidewall arms that project through said openings in said housing base, and wherein said camming lever is rotatably engaged with said collet arms.

10. A valve head as described in claim 7 wherein said depression tip is flexibly engaged to said plunger such that said tip applies minimal force to the valve pin of a Presta valve that is disposed within said gasket.

11. A valve head for engaging both a Schrader and a Presta valve, comprising:

a housing having generally cylindrical sidewalls and a base wall, said base wall having two openings formed therethrough;

a collet being disposed within a collet bore formed within said housing, said collet having generally cylindrical sidewall portions and a plurality of upwardly extending collet fingers integrally formed within said collet sidewall portions, said collet fingers including upper ends that are formed with outwardly projecting portions for engaging the sidewalls of said housing, and said collet being formed with downwardly projecting arm portions that project through said openings in said housing base;

a gasket being disposed within said collet, said gasket being generally cylindrical and having a valve insertion bore formed centrally therethrough, said gasket being composed of a resilient material;

a camming lever being operably engaged to said collet arms and functioning to pull said collet downwardly into said housing, such that upon said downward movement of said collet said collet fingers are caused to move radially inwardly due to a sliding engagement of said outwardly projecting portions of said collet fingers with said housing sidewalls;

whereby the inward movement of said collet fingers creates an inwardly directed force upon said resilient gasket such that the diameter of said gasket bore is reduced;

said housing further including a pneumatically activated plunger member that is disposed within a plunger bore formed within said housing;

a Schrader valve pin depression tip being flexibly engaged to said plunger and operable to deflect a Schrader valve pin when a Schrader valve is inserted within said valve insertion bore.

12. A valve head as described in claim 11 wherein said depression tip is flexibly engaged to said plunger such that said tip applies minimal force to the valve pin of a Presta valve that is disposed within said gasket.

* * * * *